Figure 1:
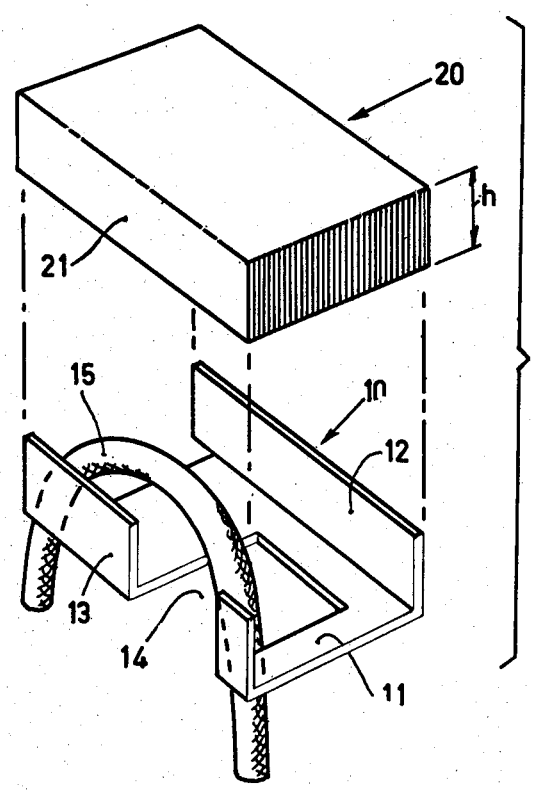

United States Patent [19]
van Riet

[11] 4,366,341
[45] Dec. 28, 1982

[54] BRIDGE FOR CONNECTING CABLE CHANNEL SYSTEMS

[75] Inventor: Martin A. van Riet, Eindhoven, Netherlands

[73] Assignee: U.S. Philips Corporation, New York, N.Y.

[21] Appl. No.: 172,786

[22] Filed: Jul. 28, 1980

[30] Foreign Application Priority Data

Aug. 17, 1979 [NL] Netherlands ............. 79062267

[51] Int. Cl.³ .............................. H02G 3/28
[52] U.S. Cl. ............................ 174/48; 52/220
[58] Field of Search ............ 174/48, 49, 65 R; 52/220, 221; 285/128, 129, 131, 132

[56] References Cited

U.S. PATENT DOCUMENTS

| Re. 28,035 | 6/1974 | Fork | 174/49 |
| 3,742,119 | 6/1973 | Newman | 174/65 R |
| 3,903,666 | 9/1975 | Fork | 52/221 |
| 4,051,640 | 10/1977 | Vincens | 52/220 |
| 4,163,572 | 8/1979 | Benscoter | 174/48 X |
| 4,194,332 | 3/1980 | Fork | 174/48 X |

Primary Examiner—Roy N. Envall, Jr.
Attorney, Agent, or Firm—Robert S. Smith

[57] ABSTRACT

The invention relates to a connecting bridge intended for use as a support of an electric connecting cable between two cable channels.

According to the invention, the bridge has an opening which is accessible from the side and in which the connecting cable can be positioned without threading that cable through the opening. After the connecting cable has been positioned, the opening is partially covered by means of an auxiliary element.

5 Claims, 6 Drawing Figures

BRIDGE FOR CONNECTING CABLE CHANNEL SYSTEMS

The invention relates to a bridge which is intended for use as a support for an electric connecting cable between two cable channel systems which are directed transversely of one another, at least one portion, which is of one piece, of the bridge having a U-shaped cross-section, there being an opening in at least the central portion of the U as a passage for the connecting cable, this opening being bounded on all sides in the mounted condition of the bridge.

The invention further relates to an assembly of a bridge of the above-described type and a system of two cable channels which are directed transversely of one another.

Cable channel systems which are directed transversely of one another, perpendicularly in particular, are found in, for example, the ceilings of some office buildings. A cable channel system may then comprise one or more electric cables which are, for example, used to supply electric power to luminaires. In order to connect a cable of one cable system to a cable of another cable channel system—directed transversely thereof—a connecting cable is used which may run through a bridge of the above-described type. Such a bridge provides a two-level connection from one cable channel system to the other cable channel system. These two-level connections are of special importance in a situation where corresponding cable channels must be electrically coupled in the case of cable channel systems comprising at least two parallel and separate cable channels, for example cable channel systems in which one cable channel comprises a cable which is connected to a voltage of, for example, 220 volts, whereas the other cable channel comprises a cable connected to a much lower voltage. The 220 volt cable is then, for example, used to supply a light source and the other cable to control switching or dimming of that light source via a relay. A complete separation of the channels—and bridge trajectories—of those two cables is then imperative, to prevent a live, defective cable from making accidental contact with an other cable.

A known bridge of the type described in the opening paragraph is described in, for example, United Kingdom patent specification No. 1,433,401. That known bridge has the drawback that the connecting cable—during mounting must be threaded through the opening, which is a cumbersome method and may even be impracticable in the case of a very stiff connecting cable.

The invention has for its object to provide a bridge of the above-described type in which the connecting cable can be positioned in a simple way—without treading—in the opening.

According to the invention there is provided a connecting bridge for use as a support of an electric connecting cable between two cable channel systems which are directed transversely of one another, at least one portion, which is of one piece, of the bridge having a U-shaped cross-section, there being an opening in at least the central portion of the U as a passage for the connecting cable, this opening being bounded on all sides in the mounted condition of the bridge, is characterized in that in the mounted condition of the bridge the circumference of the opening is only partially bounded by a bridge portion which is of one piece and also that an auxiliary element, which is movable relative to said last bridge portion, of the bridge provides the further bounding of the opening, and that in the absence of the auxiliary element the opening has an open periphery.

This bridge has the advantage that it is very simple to position the connecting cable in the opening. To that end the auxiliary element is first moved to the position in which the opening has an open periphery. This means that the opening is then not fully bounded by material. One can also say that that opening is then accesible from the plane in which the opening is located. It is then possible to place the connecting cable in the opening by means of a lateral displacement of that cable relative to the bridge portion having the U-shaped cross-section. Then the connecting cable need not be introduced into the opening by threading, that is to say the connecting cable need not be moved in a longitudinal direction. Another method which can be realized by means of the invention is to place a bridge around a connecting cable which has already been mounted, for example, by turning over the bridge portion.

After the connecting cable has been positioned in the opening the auxiliary element is moved to a position to close the periphery of the opening.

The invention is therefore based on the notion that to make the opening first accessible from the side, to enable the positioning of the connecting cable. That way of access is not closed until after the connecting cable has been positioned in the opening.

The auxiliary element may, for example, be part of the cable channel system, for example an upper edge of a cable channel. The auxiliary element may alternatively be in the form of a separate bridge portion and/or a cover element in the form of a lid.

The bridge consists, for example, of a combination of the auxiliary element and one bridge portion having a U-shaped cross-section. The opening in that said bridge portion having a U-shaped cross-section is then, for example, located partly in the central portion of the U and partly in an upright portion of that U in which the opening ends, that is to say where that opening has its unbounded portion. In the mounted condition of the auxiliary element this auxiliary element closes an opening portion located in the upright portion of the U.

In a preferred embodiment of a connecting bridge according to the invention the auxiliary element is in the form of a second bridge portion having a U-shaped cross-section, and that in the mounted condition of the bridge the two bridge portions having U-shaped cross-sections substantially in line, and that the second bridge portion is located at the other side of the opening.

This bridge has the advantage that it can very simply provide an electric coupling of a first cable channel system to a second cable channel system which is directed transversely thereof and which extends on either side of the first cable channel system (called continuous cable channel system hereinafter). The opening may then comprise two connecting cables, one of which is supported by one bridge portion and the other one by the other bridge portion. One connecting cable then leads from the first cable channel system to a first portion of the second cable channel system and the other connecting cable leads from the first cable channel system to a second portion, located on the other side of the first cable channel system, of the second cable channel system. After positioning of the two connecting cables a lid-shaped element may, if so desired close the bridge portions, at least at the side facing away from the opening.

In an improvement of the above-mentioned preferred embodiment one bridge portion has a length which is at least equal to twice the length of the other bridge portion.

This improved version has the advantage that it provides a simple coupling element for continuous channel systems which are directed transversely of one another and—as mentioned earlier in this description—are provided with two parallel and separate cable channels. One cable channel then comprises for example, a high voltage cable and the other cable channel a low voltage cable. A cable channel may then be coupled to a corresponding channel of an other continuous cable channel system in such a way, that the bridge portion of the greater length crosses a non-corresponding cable channel before it reaches a corresponding channel, whereas the bridge portion of the shorter length effects a coupling to a neighbouring corresponding channel. In addition, it should be born in mind that, in that case, two bridges are required for a full coupling, namely one for the connection of the high voltage cables and one for the connection of the low voltage cables.

In a next preferred embodiment of a bridge according to the invention an end, which faces away from the opening—and also from the upright portion of the U—of the central portion of the U of the bridge portion which is of one piece comprises a plate-shaped element which is directed transversely of the longitudinal direction of that bridge portion.

This preferred embodiment has the advantage that the plate-shaped element may form a cover of a cable channel. Such a cover may, for example, be desirable to prevent mice or other small animals from including the cable channel in their path. The following should be noted by way of explanation. In the case of two cable channels which are perpendicular to one another and have been mounted on the same base plate only one of those channels may, of course, be uninterrupted. The other channel is interrupted in the region of the uninterrupted channel. In a bridge according to the last-mentioned preferred embodiment the plate-shaped element may cover such an interrupted cable channel. The use of separate cover elements or a very accurate mounting of the interrupted cable channel so that it is closed by the outer wall of the uninterrupted cable channel is then avoided.

The invention also relates to an assembly of a bridge according to the invention and a system of two cable channel systems which are directed transversely of one another, the bridge supporting an electric connecting cable between the two cable channel systems, at least one of the cable channel systems comprising at least two separate and substantially parallel cable channels.

This assembly has the advantage that customary cable systems are then coupled in a simple manner.

Figure 2:
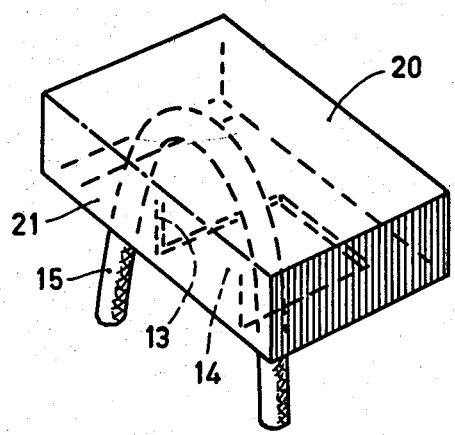
Figure 3:
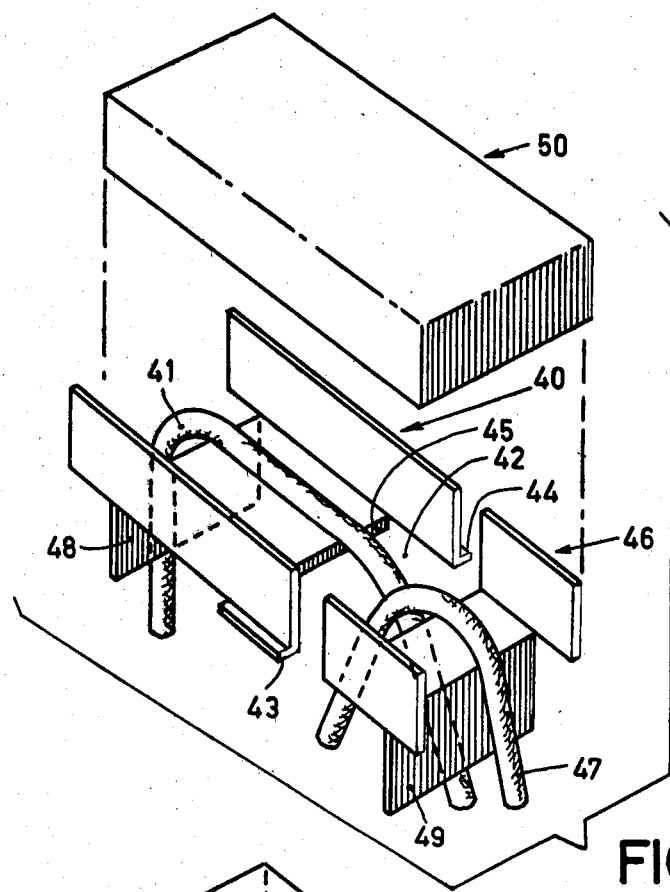
Figure 4:
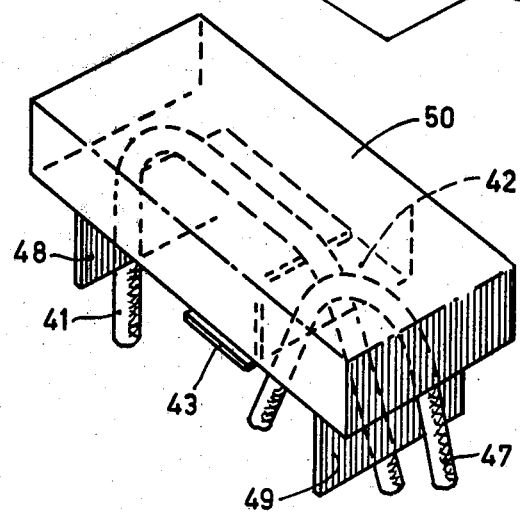
Figure 5:
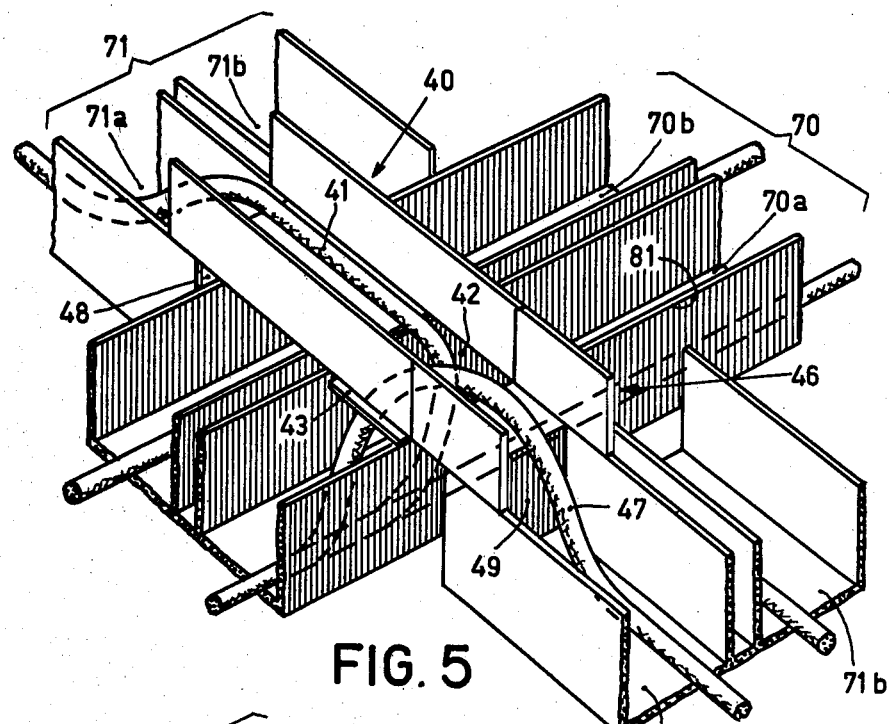
Figure 6:
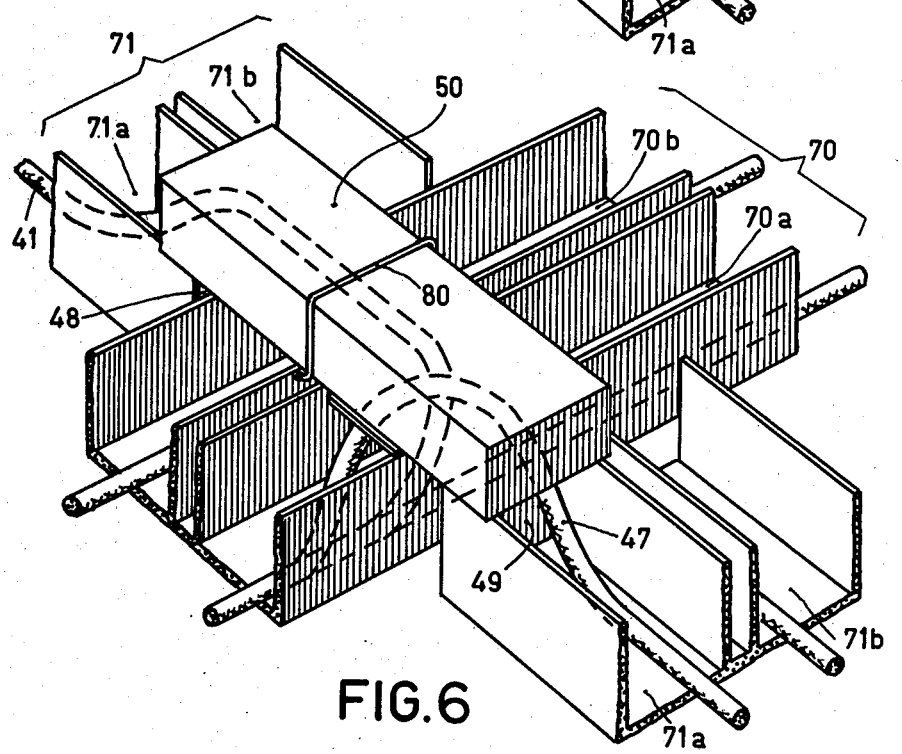

The invention will now be further explained with reference to the accompanying drawings. In the drawings:

FIG. 1 shows a perspective view of an electric cable and a bridge portion of a first connecting bridge and also a perspective view of a lid-shaped auxiliary element of the first connecting bridge according to the invention, FIG. 2 shows a perspective view of the first connecting bridge according to the invention, in the mounted condition, as well as an electric cable, FIG. 3 shows a perspective view of an electric cable and of a first bridge portion of a second connecting bridge, a perspective view of a further electric cable and of a second bridge portion of the second connecting bridge, a perspective view of a lid-shaped element of the second connecting bridge according to the invention, FIG. 4 shows a perspective view of the second connecting bridge according to the invention, in the mounted condition, as well as two electric cables, FIG. 5 shows a combination of FIG. 3 as well as a perspective view of two continuous cable channel systems, which are directed substantially perpendicularly to one another, each system comprising two cable channels and, FIG. 6 shows a combination of FIG. 4, as well as a perspective view of two cable channel systems which are directed substantially perpendicularly to one another, each comprising two cable channels. Thus, this FIG. 6 shows an assembly of the second connecting bridge and a system of two cable channel systems, the bridge accommodating two connecting cables which interconnect corresponding cables of the cable channel systems.

FIG. 1 shows a sheet steel bridge portion 10, which is of one piece and has a U-shaped cross-section. The bridge portion 10 has a central portion, or bottom 11 and upright walls 12 and 13 with an opening 14 extending into the central portion 10 and also into the wall 13. The opening 14 has an open periphery. An electric connecting cable 15 passes through the opening 14. The cable 15 is placed into the opening 14 by means of a lateral displacement—of that cable—through that part of the opening which is located in the wall 13.

FIG. 1 also shows a lid-shaped auxiliary element 20, having a U-shaped cross-section and a U-shaped longitudinal section, which is intended to co-operate with the bridge portion 10 of FIG. 1. The element 20 has a side wall 21. The length and the height h of the auxiliary element 20 are substantially equal to the corresponding dimensions of the bridge portion 10. The auxiliary element 20 is, however, slightly wider than the bridge portion 10, namely such that after mounting (see FIG. 2) the auxiliary element 20 tightly fits the bridge portion 10.

FIG. 2 shows the bridge in its mounted condition. The side wall 21 of the auxiliary element 20 then covers a portion of the opening in the upright wall 13. As, in this mounted condition of the bridge, the periphery of the opening is dosed by the bridge material, the cable 15 can no longer escape in the lateral direction.

The manner in which this connecting bridge (10,20) is used to provide a coupling between two cable channel systems which are directed transversely of one another is similar to that described hereinafter for the second bridge according to the invention. Reference is made to the FIGS. 5 and 6 in particular, as well as to the associated text. It should, however, already be noted here that first the bridge portion having the opening 14 is placed on a cable channel, namely in the region of meeting cable channel systems to be coupled of which that cable channel forms part. Thereafter the connecting cable 15 is moved sideways into the opening 14 and the lid-shaped auxiliary element 20 is fitted thereafter. The connecting cable portion which passes through cylindrical portion of the bridge (10, 20) then leads to a cable channel of the other cable channel system.

FIG. 3 shows a first bridge portion 40 of a second bridge according to the invention. Bridge portion 40 has a U-shaped cross-section. An electric connecting cable 41 is located in the bridge portion 40. The central portion of the bridge portion 40 has an opening 42. The bridge portion is further provided with three beaded edges (43, 44 and 45, respectively).

FIG. 3 also shows a second bridge portion 46 of the second bridge. This second bridge portion 46 is similar to the first bridge portion, but is of a different length and does not have an opening comparable with opening 42. The first bridge portion is more than twice the length of the second bridge portion (17.5 cm and 7.5 cm, respectively). The length of the first bridge portion is therefore more than 1.5 times the length of the second bridge portion. An electric connecting cable 47 is located in the second bridge portion.

For the purpose of mounting this bridge, the bridge portions 40 and 46 are placed in line in a manner shown by the FIG. 3. These bridge portions 40 and 46 are, however, moved up to one another until the edges of the upright U-shaped portions contact one another. The opening 42—in the absence of the auxiliary element 46 and/or 50, see FiG. 3—has an open periphery.

It should be noted that the central portion of the U of each of the two bridge portions 40 and 46, at the side facing away from the opening 42, extends less far than the upright walls of the U of those two bridge portions. This has for its object to provide further passages for the cables 41 and 47, respectively. In addition, the central portion of the two bridge portions 40 and 46 is provided with a plate-shaped element 48 and 49, respectively, which is directed transversely of the longitudinal direction of the relevant bridge portion, namely in a position which faces away from the opening 42—and also from the upright portions of the U. In the fully mounted condition the plate-shaped elements 48 and 49 will serve to cover a cable channel of a cable channel system.

FIG. 3 also shows a hollow lid-shaped element 50 having a U-shaped cross-section and a U-shaped longitudinal section. This element 50 is pushed onto the combination of the two bridge portions 40 and 41, which results in a situation as shown in FIG. 4.

FIG. 5 shows again the combination of the bridge portions shown in FIG. 3, now together with two continuous cable channel systems 70 and 71 to be coupled, which are directed transversely of one another. Each of those cable channel systems comprises two substantially parallel cable chanels 70a and 70b, and 71a and 71b, respectively. The cable channels indicated by a comprise high voltage cables to be coupled. The cable channels indicated by b comprise low voltage cables. The bridge shown in FIG. 5, which is in the assembly stage, is only used for the coupling of the high voltage cables.

The connecting cables 41 and 47 have been moved into the opening 42 by displacing them laterally, in a configuration as, for example, represented by FIG. 3.

FIG. 6 shows the same situation as FIG. 5, now, however, with a mounted element 50 (see also FIG. 4). The plate-shaped elements 48 and 49 provide a mechanical enclosure of the cable channels 71a, which comprise a high voltage cable, of the interrupted cable channel system 71 extending on both sides of the uninterrupted cable channel system 70. The bridge (40, 46, 50) is clamped with a bracket 80 onto the cable channel systems.

Such a bridge may be used for coupling the cable channels comprising low voltage cables. This bridge must then be set up to the right of the bridge (40, 46, 50), viewed in the direction shown in FIG. 6. The bridge portions corresponding with the portions 40 and 46 must then, however, be exchanged. Then the cable channels 70b and 71b, which comprise low voltage cables, can be coupled to one another.

If so desired, the open portions of the cable channel systems may be covered with plate-shaped elements (not shown).

It should be noted (see FIG. 5) that also in the case that only the bridge portion 40 is present, in addition to the two cable channel systems 70 and 71, a connecting bridge according to the invention is obtained. In this case, the opening 42 will namely be completely bounded by the combination of the material of the bridge portion 40 and an upper edge 81 of the cable channel 70a, this upper edge functioning as the auxiliary element, which is then not in the shape of a lid. Alternatively, if so desired, a U-shaped cover on portion 40 only may be used.

Placing the connecting cables is considerably simplified by means of the described bridges according to the invention, particularly since there is no need to thread the cables through the relevant openings.

What is claimed is:

1. A connecting bridge for use as a support for an electric connecting cable between two cable channel systems which are directed transversely of one another, at least one bridge portion of one piece, said bridge portion having a U-shaped cross-section, there being an opening in at least the central portion of the U-shaped cross-section which is a passage for the connecting cable, this opening being bounded on all sides the mounted condition of the bridge, characterized in that in the mounted condition of the bridge portion the circumference of the opening is only partially bounded by the bridge portion which is of one piece and the apparatus also includes an auxiliary element, which is movable relative to said bridge portion, said bridge portion providing the further bounding of the opening, and that in the absence of the auxiliary element the opening has an open periphery.

2. A connecting bridge as claimed in claim 1, characterized in that the auxiliary element is in the form of a second bridge portion having a U-shaped cross-section, and that in the mounted condition of the bridge the two bridge portions having U-shaped cross-sections are substantially in line, and that the second bridge portion is located at the other side of the opening.

3. A connecting bridge as claimed in claim 2, characterized in that the length of one bridge portion is at least equal to twice the length of the other bridge portion.

4. A connecting bridge as claimed in claim 1, 2 or 3, characterized in that an end facing away from the opening—and also from the upright portions of the U—of the central portion of the bridge portion which is of one piece comprises a plate-shaped element which is directed transversely of the longitudinal direction of that bridge portion.

5. An assembly of a bridge as claimed in claim 1, 2 or 3 for two cable channel systems which are directed transversely of one another, the bridge supporting an electric connecting cable between the two cable channel systems, at least one of those cable channel systems comprising at least two separate and substantially parallel cable channels.

* * * * *